United States Patent [19]

Murakami et al.

[11] Patent Number: 5,574,758

[45] Date of Patent: Nov. 12, 1996

[54] METHOD FOR MEASURING GAMMA-RAYS OF RADIONUCLIDES, PARTICULARLY IN PRIMARY WATER OF NUCLEAR REACTOR

[75] Inventors: Ryuji Murakami, Nara; Masataka Yamada; Hirofumi Shintani, both of Osaka; Shingo Ando, Kanagawa, all of Japan

[73] Assignee: Nuclear Engineering, Ltd., Osaka, Japan

[21] Appl. No.: 371,291

[22] Filed: Jan. 11, 1995

[30] Foreign Application Priority Data

Feb. 3, 1994 [JP] Japan ..................................... 6-033188

[51] Int. Cl.$^6$ ................................................. G21C 17/02
[52] U.S. Cl. ..................... 376/245; 376/253; 250/370.06; 250/371
[58] Field of Search ...................... 376/245, 250, 376/251, 253; 250/303, 370.06, 370.11, 370.07, 371

[56] References Cited

U.S. PATENT DOCUMENTS

| | | | |
|---|---|---|---|
| 3,783,268 | 1/1974 | Neeb et al. | 250/83.3 R |
| 3,786,257 | 1/1974 | Weiss et al. | 250/83.3 R |
| 3,819,936 | 6/1974 | Weiss et al. | 250/83.3 R |
| 3,849,655 | 11/1974 | Martucci | 250/366 |
| 4,532,103 | 7/1985 | Kitaguchi et al. | 376/245 |
| 4,841,153 | 6/1989 | Wormald | 250/390.04 |

OTHER PUBLICATIONS

Nuclear Instruments and Methods, vol. 133, No. 1 (1976), pp. 35–49, Stelts et al.

Proc. of Conf. on Semiconductor Nuclear–Particle Detectors and Circuits. Gatlinburg, Tenn. USA, (1968) pp. 693–702, Camp.

Primary Examiner—Harvey E. Behrend
Attorney, Agent, or Firm—Flynn, Thiel, Boutell & Tanis, P.C.

[57] ABSTRACT

A gamma-rays measurement method of radionucludes (iodine-131, cobalt-60, etc.) coexisting with radionuclides (nitrogen-13, fluorine-18, cobalt-58, etc.) each emitting a pair of annihilation gamma-rays, particularly in primary water of a nuclear reactor by the use of a gamma-ray spectrometric system which includes a primary detector for detecting the gamma-rays and the one annihilation gamma-rays as pulses, a secondary detector for detecting the other annihilation gamma-rays as pulses, and shield detector for detecting gamma-rays Compton-scattered and escaped from the primary to shield detectors as pulses. The method comprises counting the pulses of the secondary detector in anticoincidence with the pulses of the primary detector, thereby to reject the recording of the annihilation gamma-rays from the primary detector, thus minimizing the annihilation gamma-rays disturbing to the measurement, followed by determining count numbers of the gamma-rays. Detection limits of the gamma-rays can be elevated significantly thereby. Simultaneously, further anticoincidence counting of the shield detector with the primary detector can be conducted to diminish the Compton-scattered gamma-rays.

6 Claims, 2 Drawing Sheets

METHOD FOR MEASURING GAMMA-RAYS OF RADIONUCLIDES, PARTICULARLY IN PRIMARY WATER OF NUCLEAR REACTOR

BACKGROUND OF THE INVENTION

1. Field of the Invention

This invention relates to a method for measuring gamma rays of trace amounts of radionuclides (radioisotopes), such as iodine-131, cobalt-60, etc., particularly in primary water of a nuclear reactor, which further contains other radionuclides such as nitrogen-13, fluorine-18, cobalt-58, etc. each emitting a pair of annihilation gamma-rays. More particularly, the invention is concerned with an improved gamma-ray spectrometric method for measuring selectively gamma-rays of the aforementioned radionuclides by diminishing the annihilation gamma-rays emitted by radionuclides coexisting in the primary water, thus significantly elevating the detection limits of the gamma-rays.

2. Statement of Related Art

For instance, at nuclear power plants, with a view toward safe operation thereof, leakage of nuclear fuel assemblies is always kept under surveillance, for example, by measuring gamma-rays of $^{131}$I $^{60}$Co ,etc. contained in trace amounts in water of a primary coolant of an individual nuclear reactor.

However, other radionuclides such as $^{13}$N, $^{18}$F, $^{58}$Co, etc., which are unstable radionuclides emitting $\beta^{+(e+)}$ or positron, are also contained in the primary water, and soon $\beta^+$ decay at a low energy level by absorption in a substance and bonding with electrons therein at the end of their ranges. At that time, one positron and one electron are annihilated, emitting annihilation gamma-rays of 0.511 MeV in diametrically opposite directions.

The coexistence of the radionuclides emitting the annihilation gamma-rays is a major disturbing factor for the measurement of the intended gamma-rays, particularly gamma-ray of $^{131}$I, which has a close energy level (0.364 MeV) to the annihilation gamma-rays.

Additionally, Compton scattering caused inevitably in a gamma-ray spectrometry also interferes with the intended measurement.

As a consequence, it is essential for gamma-ray spectrometric measurement of gamma-rays of the intended radionuclides ($^{131}$I, $^{60}$Co, etc. ) in the primary water that the annihilation gamma-rays be minimized while Compton backgrounds or continua of the resulting gamma-spectra due to the gamma-rays and annihilation gamma-rays are suppressed.

Hitherto, iodine-131 and other radionuclides emitting gamma-rays in water of a primary coolant has been measured by means of a germanium (Ge) detector or a scintillation detector of NaI(Tl) (sodium iodide activated by thallium) or $Bi_4Ge_3O_{12}$ (bismuth germanate known as BGO), or a gamma-ray sepctrometric measurement system wherein a scintillation detector is disposed around a germanium detector. The method using the Ge detector was poor in detection limit of $^{131}$I owing to the effect of Compton backgrounds produced from $^{131}$I gamma-ray, $^{60}$Co gamma-ray the annihilation gamma-rays, etc., so that trace amounts of $^{131}$I and other radionuclides emitting gamma-rays in the primary water couldn't be measured. Only in the event that $^{131}$I, $^{60}$Co, etc. were leaked from a fuel assembly into the primary water, increased concentrations of them enabled the measurement.

Again, the method using the NaI(Tl) detector was too inferior to the Ge detector method in resolution power.

The method using both Ge detector and scintillation detector has been improved more or less over the preceding methods, but it has still not been possible to measure extremely slight concentrations of $^{131}$I, $^{60}$Co and others.

Thus, any of the known gamma-ray spectrometric methods has not been satisfactory and feasible because the annihilation gamma-rays from coexsiting radionuclides in the primary water have interfered with the measurement of the intended radionuclides, e.g., $^{131}$I, etc.

Another method for measuring $^{131}$I and other radionuclides by chemical analysis has been known, but has yielded disadvantageously awkward radioactive wastes, which should be handled or disposed of with great care. Hence, this is not suitable for frequent or continuous measurement.

In view of the drawbacks or problems as encountered in the prior art measurement methods of gamma-rays in primary water of a nuclear reactor as stated above or gamma-rays in another radioactive substances, the present invention is designed to provide a gamma-ray spectrometric measurement method which enables to significantly enhance detection limits of gamma-ray-emetting radionuclides, particularly in the primary water.

That is to say, it is a primary object of the invention to provide an improved method for measuring selectively gamma-rays of radionuclides (iodine-131, cobalt-60, etc.), particularly in the primary water contained in micro-quantities by excluding disturbing factors to the measurement, namely, the aforesaid annihilation gamma-rays emitted by other radionuclides coexisting in the primary water, and Compton effects due to the gamma-rays and annihilation gamma rays as far as possible.

Another object of this invention is to provide a high-sensitive measurement method capable of detecting such extremely slight amounts of the radionuclides emitting gamma rays in the primary water that it has been not possible to detect hitherto.

Further object is to provide a reliable measurement method which enables continuous surveillance of leakage of a nuclear fuel assembly, thereby assisting in early prevention of the risk.

SUMMARY OF THE INVENTION

The invention for achieving the foregoing objects resides generally in a method for measuring selectively gamma-rays of radionuclides of microquantities, particularly in primary water of a nuclear reactor, coexisting with radionuclides each emitting a pair of annihilation gamma-rays in diametrically opposite directions, using a gamma-ray spectrometric system which includes a primary detector for detecting photons of the gamma-rays and photons of the one annihilation gamma-rays in the one direction, a secondary detector for detecting at least photons of the other annihilation gamma-rays in the opposite direction, a 10 shield detector for detecting photons of Compton-scattered gamma-rays escaped from the primary detector to the shield detector, and an anticoincidence circuit connecting with the primary, secondary, and shield detectors, the primary detector and the secondary detector being located in opposed manner relative to the axis of a coolant pipe, through which the primary water flows, the shield detector being disposed to surround the primary detector except for its portion facing to the pipe on which the gamma-rays and the annihilation gamma-rays are incident.

The method comprises: detecting the photons of the gamma-rays and the photons of the one annihilation gamma-rays on the primary detector as pulses while detecting the photons of the other annihilation gamma-rays on the secondary detector as pulses; and counting the pulses from the secondary detector in anticoincidence with the pulses from the primary detector thereby to reject the recording of the pulses of the annihilation gamma-rays, thus minimizing the annihilation gamma-rays; and subsequently measuring count numbers of the gamma-rays on the basis of the analysis of the pulses.

More preferably, the method further comprises, simultaneously with the foregoing detecting step, detecting the photons of the Compton-scattered and escaped gamma-rays on the shield detector as pulses and counting the pulses from the shield detector in anticoincidence with pulses from the primary detector thereby to reject the recording of the pulses of the Compton-scattered gamma-rays, thus additionally diminishing the Compton gamma-rays.

According to the method of this invention, when the photons of the annihilation gamma-rays emitted in diametrically opposite directions are coincidently detected on the primary and secondary detectors located in an opposed relation to each other, the resulting pulses are rejected by anticoincidence counting operation of the anticoincidence circuit, whereby the annihilation gamma-rays are vastly reduced from the primary detector. Consequently, it is possible to elevate significantly the detection limits of the intended gamma-rays of iodine-131, cobalt-60, etc.

Further according to a preferred embodiment, when the photons of Compton-scatterered gamma-rays are coincidently detected on the primary and shield detectors, the resulting pulses are rejected by anticoincidence counting operation of the anticoincidence circuit, whereby the Compton gamma-rays are also significantly diminished from the primary detector, which enables to further enhance the detection limits of the intended gamma-rays of radionuclides.

BRIEF DESCRIPTION OF THE DRAWINGS

Examples of the invention will be hereinbelow described in more detail with reference to the accompanying drawings; in which.

DESCRIPTION OF THE PREFERRED EMBODIMENTS

Figure 1:
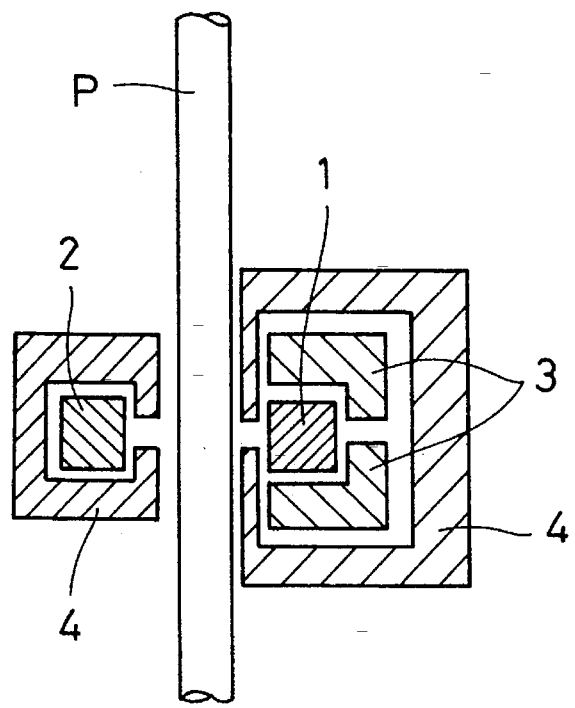
FIG. 1 is a schematic longitudinal sectional view of one example of a gamma-ray spectrometric measurement system for carrying the method of this invention into effect showing only a detecting device as an essential part of the system.
Figure 2:
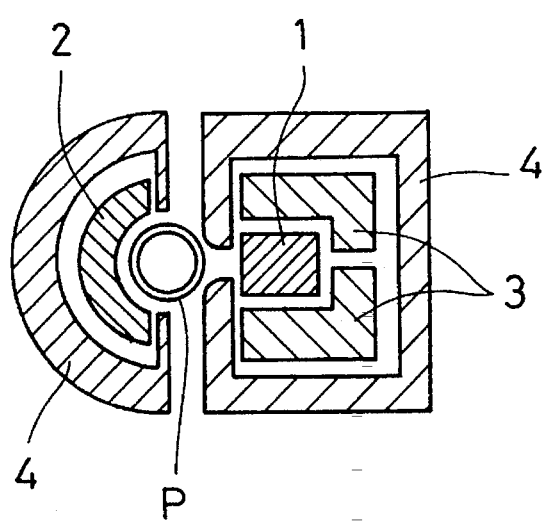
FIG. 2 is a schematic transverse sectional view of the detecting device in FIG. 1.

Referring to FIGS. 1 and 2, a detecting device is shown, which comprises a primary detector 1 and a secondary detector 2 located in mutually opposed manner relative to the axis of a pipe P, e.g., a coolant pipe, through which for example, water of a non-reproductive cooler (not shown) flows, and a shield detector 3 surrounding substantially the whole perimeter of the primary detector 1 except for its portion facing the pipe.

The primary detector 1 is constructed preferably of a semiconductor detector or a scintillation detector.

The secondary detector 2 and the shield detector 3 are constructed each of one or more scintillation detectors.

The semiconductor detector to be used includes, for example, HP Ge (high-purity germanium) detector, Si(Li) (lithium drift silicon) detector, CdTe (cadmium telluride) detector, GaAs (gallium arsenide) detector, $HgI_2$ (mercuric iodide) detector, etc.

The scintillation detector usable for this invention includes, for example, NaI(Tl) (sodium iodide activated by tallium) detector, CsI(Tl) (cesium iodide activated by thallium) detector, $Bi_4Ge_3O_{12}$ (bismuth germanate known as BGO) detector, or the like.

The secondary detector 2 is configured in a sector-form so as to surround a half to one-third of the periphery of the coolant pipe P.

The primary, secondary, and shield detectors 1,2,3 are surrounded by lead shields 4 except for their directions in which gamma-rays and annihilation gamma-rays in the primary water are incoming and detected so that the incident gamma-rays and annihilation gamma-rays may be collimated and the incident dose of the gamma-rays and annihilation gamma-rays may be restricted.

Figure 3:
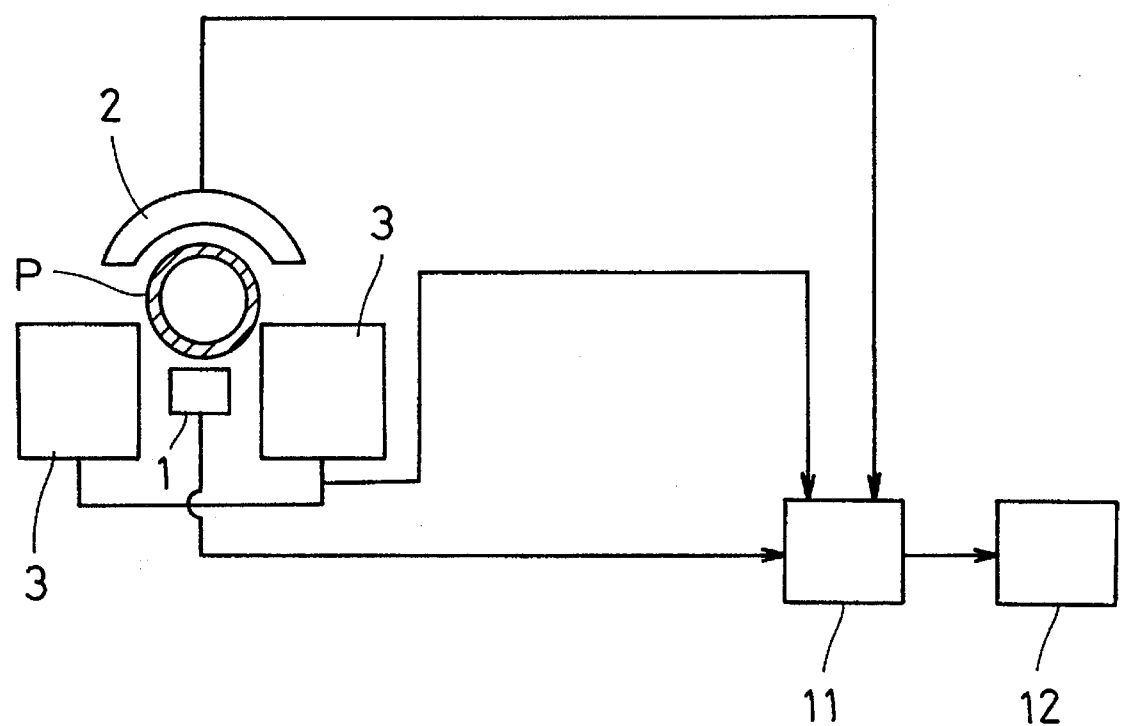
FIG. 3 is a diagrammatic illustration of a gamma-ray spectrometric measurement system used for this invention showing its essential elements.

The detecting device including the primary detector 1, the secondary detector 2 and the shield detector 3 is connected with an anticoincidence circuit 11 for operating an anticoincidence counting between the primary and secondary detectors 1,2 and between the primary and shield detectors 1,3, and a multichannel pulse height analyzer 12, thus forming a gamma-ray spectrometric system as a whole, as shown in FIG. 3 in which essential components only are depicted with other components omitted since they are well-known per se in the art.

In the gamma-ray spectrometry system thus constructed, the primary detector 1 serves to detect photons of gamma-rays from $_{131}I$, $_{60}Co$, and the like as intended as well as photons of the one annihilation gamma-rays as pulses; the secondary detector 2 serves to detect photons of the other annihilation gamma-rays as pulses; and the shield detector 3 serves to detect photons of the gamma-rays, which are Compton-scattered and escaped from the primary to the shield detectors, as pulses.

When the photons of the gamma-rays or annihilation gamma-rays are detected on a germanium detector, an interaction of the photons with the germanium material yields gamma-ray spectra which usually include each a photoelectric peak due to full energy absorption event and a continuous sepctrum called Compton continuum or background due to once or twice scattering and subsequent escaping of the scattered photons outside the detector. Thus, the full energy absorption event is never attended with the escaping of scattered photons.

The photopeak is utilized to determine the gamma-ray energy which is important for identification and quantitative determination of a radionuclide whereas the Compton backgound is a disturbing factor for the gamma-ray spectrometric measurement.

Consequently, when the escaped photons are detected coincidently by means of the shield detector 3 and the primary detector 1 and an anticoincidence counting is operated, that tends to reject selectively the Compton scattering events only without affecting the full energy events.

Further simultaneously when the annihilation gamma-rays are coincidently detected on the primary detector 1 and the secondary detector 2, and an anticoincidence counting is operated, that assists in rejecting selectively the events due to the annihilation gamma-rays without affecting the full energy events.

More specifically, the rejection is conducted by passing the pulses from the primary detector 1 through electron gates of the anticoincidence circuit 11 which are adapted to be closed when pulses are detected on the secondary detector 2 and the shield detector 3, coincident with the detection on the primary detector 1.

The rejection by anticoincidence counting operation yields the result that the annihilation gamma-rays and Compton background gamma-rays are significantly reduced, which enables it to increase the photopeak-to-background ratio in the spectrum and accordingly, to determine the count numbers of the intended gamma-rays with more precision.

In the multichannel pulse height analyzer 12, the pulses detected by conversion of the radiation energy to voltage or current in proportion to the energy are divided into thousands of intervals (namely, multichannels) over the whole voltage or current pulse range, and number ratios of the pulses belonging to the respective channels are determined, thus yielding an energy distribution of the gamma-rays, i.e. gamma-spectra, from which count numbers of the intended gamma-rays are determined.

One example of a method of the invention will be explained when applied to primary water of a nuclear reactor, i.e. non-reproductive cooler by fitting a coolant pipe P connecting to the cooler on its inflow side with the detecting device as described above including the primary, secondary, and shield detectors 1,2,3.

As the primary detector 1, a germanium detector was used, which had a good energy resolution having a half band width of up to 2.0 KeV when 1.33 MeV gamma-ray of $^{60}$Co was taken as a standard and a counting efficiency of at least 75%.

The shield detector used has such dimensions that make the Compton background (continuum) in the 131I area of the spectrum smaller than 1/10 of that without Compton suppression.

When pulses from the primary detector 1 were counted in anticoincidence with pulses from the secondary detector 2 and the shield detector 3 by the operation of the anticoincidence circuit 11, the annihilation gamma-rays and Compton gamma-rays could be significantly diminished.

Then, count numbers of the gamma-rays from $^{131}$I, $^{60}$Co, and others in the primary detector 1 were determined from the resulting gamma-spectra by analysis with the multichannel pulse height analyzer 12.

As a result, the detection limit of I gamma-ray area was enhanced to less than 1.5 Bq/cm$^3$, more than 10 times as high as that (15 Bq/cm$^3$) of a conventional method without reduction of the annihilation gamma-rays.

This invention has been so far described, by way of example, with a primary water of a nuclear reactor, but the method can be naturally used for the analysis of: steam of a secondary system (from a steam generator), drain water of a primary coolant, chemical analysis of a primary coolant, etc. in the nuclear power field.

However, this invention is also applicable to other fields, namely, researches in high energy physics, micro-analysis in accelerator engineering, etc.

As described above, the conspicuous elevation of the detection limits of gamma-rays makes it possible to conduct continuous measurement of highly low-concentrations of radionuclides in primary water of a nuclear reactor, with the result that security of the nuclear reactor can be ensured by early detection of leakage of the fuel assembly. Further, it is possible to decrease the frequency of chemical analysis for detecting the leakage which has been hitherto performed in nuclear power plants.

What is claimed is:

1. A method for measuring selectively gamma-rays of radionuclides, in primary water of a nuclear reactor, which further contains radionuclides each emitting a pair of annihilation gamma-rays in diametrically opposite directions, by the use of a gamma-ray spectrometric system which includes a primary detector for detecting photons of the gamma-rays and photons of the one annihilation gamma-rays in the one direction, a secondary detector for detecting at least photons of the other annihilation gamma-rays in the opposite direction, a shield detector for detecting Compton-scattered photons of the gamma-rays escaped from the primary detector to the shield detector, and an anticoincidence circuit connecting with the primary, secondary, and shield detectors, the primary detector and the secondary detector being located in opposed manner relative to the axis of a coolant pipe through which the primary water flows, the shield detector surrounding the primary detector except for its portion facing the pipe on which the gamma-rays and the annihilation gamma-rays are incident, which method comprises: detecting the photons of the gamma-rays and the photons of the one annihilation gamma-rays on the primary detector as pulses while detecting the photons of the other annihilation gamma-rays on the secondary detector as pulses;

counting the pulses of the secondary detector in anticoinci- dence with the pulses of the primary detector thereby to reject the recording of the pulses of the annihilation gamma-rays from the primary detector, thus minimizing the annihilation gamma-rays on the primary detector; and subsequently determining count numbers of the gamma-rays.

2. A method for measuring selectively gamma-rays of radionuclides, in primary water of a nuclear reactor as set forth in claim 1, which further comprises simultaneously detecting the Compton-scattered photons of the gamma-rays on the shield detector as pulses; and counting the pulses of the shield detector in anticoincidence with the pulses of the primary detector thereby to reject the recording of the Compton-scattered gamma-rays from the primary detector, whereby the Compton-scattered gamma-rays on the primary detector are also diminished.

3. The method for measuring selectively gamma-rays of radionuclides as set forth in claim 1, which comprises using a semiconductor detector or a scintillation detector as the primary detector, and scintillation detectors as the secondary and shield detectors.

4. The method for measuring selectively gamma-rays of radionuclides as set forth in claim 2, which comprises using a semiconductor detector or a scintillation detector as the primary detector, and scintillation detectors as the secondary and shield detectors.

5. A method for measuring selectively gamma-rays of radionuclides as set forth in claim 3, wherein the semiconductor detector is selected from a germanium detector, lithium drift silicon detector and cadmium telluride detector; and the scintillation detector is selected from a detector of sodium iodide activated by thallium, detector of cesium iodide activated by thallium, and bismuth germanate detector.

6. A method for measuring selectively gamma-rays of radionuclides as set forth in claim 4, wherein the semiconductor detector is selected from a germanium detector, lithium drift silicon detector and cadmium telluride detector; and the scintillation detector is selected from a detector of sodium iodide activated by thallium, detector of cesium iodide activated by thallium, and bismuth germanate detector.

* * * * *